April 30, 1968   N. J. MELCHER   3,380,697

PORTABLE STEPS FOR CLIMBING TREES OR POLES

Filed Oct. 11, 1966

INVENTOR.
NORMAN J. MELCHER
BY Schroeder, Siegfried
& Ryan
ATTORNEYS

__ United States Patent Office __ 3,380,697
Patented Apr. 30, 1968

3,380,697
PORTABLE STEPS FOR CLIMBING
TREES OR POLES
Norman J. Melcher, 4559 Jefferson St.,
Minneapolis, Minn. 55421
Filed Oct. 11, 1966, Ser. No. 585,938
5 Claims. (Cl. 248—216)

ABSTRACT OF THE DISCLOSURE

A portable step for climbing trees or poles is formed from square cross-section metal stock in the form of the letter L shape, the joining angle being more acute than a right angle, and having a screw with its shank pivotally secured within a recessed portion of the upper end of the stem member. The screw is pivotal to a position within the recess in the stem and remains so for carrying, while swinging outwardly to another position permitting pressure to be applied to the crossbar portion for driving the screw into a tree or pole, and then swinging the stem and crossbar into position for climbing.

---

This invention relates to the field of angled load supports and particularly to the field of portable steps used for climbing trees and the like.

Sportsmen have generally found when hunting certain wild game, that it is quite advantageous to secure a hunting position in a tree, thereby providing the hunter with a relatively high position to survey the area for game. However, finding the means to ascend into the tree proves rather difficult when the tree is of rather large size and the hunter is confronted with getting his hunting gear to the high perch position.

Numerous devices have been tried for aiding the hunter in climbing to this position, one such device being an angled step in which the screw portion thereof is permanently fixed to extend substantially parallel but offset in the opposite direction to that part of the bracket forming the step portion. Furthermore, the screw portion is generally of a diameter almost the same as the diameter as the material from which the step is formed. The real problem associated with such a step is in getting the step started into the tree or the like. Because of the offset construction, the prior art devices prove to be difficult in applying the pressure to the end of the screw in starting the step into the tree. In fact, in some instances it is found that it is almost necessary, as well as desirable, to drive the screw portion in by striking it with a hammer or hatchet.

On the other hand, the angled supports provided in my invention are formed with a screw which can be extended from one end of the steps much in the manner of a screw being driven into a piece of wood by a screwdriver. The step portion then becomes part of the "screwdriver" and the device is driven in place. In other words, the wrist twisting action is used to drive the screw into the wood while maintaining a pressure on the shank end of the screw and this proves to secure the foot step to the tree with very little effort in comparison to the offset type just described.

It is therefore a general object of this invention to provide an improved load support used primarily for an aid in climbing trees or hanging loads from a vertically extending object through the use of the same.

It is still another object of the present invention to provide an angled support which may readily be mounted or demounted from a vertical support in the manner a screw is started or removed from the vertical support.

It is still a further object of the invention to provide an angle support having a pivotal screw member to aid in starting and removing the support from a tree or other vertically extending objects.

It is another object of this invention to provide an angled support having a pivotal screw member which collapses into the angled support to provide a compact article for carrying by a hunter or outdoorsman.

These and other objects and advantages of my invention will more fully appear from the following description, made in connection with the accompanying drawings, wherein like reference characters refer to the same or similar parts throughout the several views, and in which.

Figure 1:
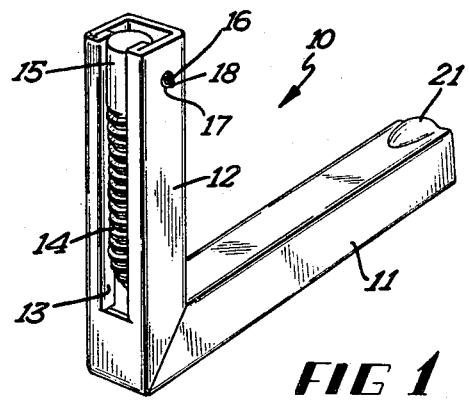
FIG. 1 is an isometric view of the angle support with the attaching screw pivoted into the support.

In FIG. 1, an L-shaped support member 10 is formed from a base element 11 and an upstanding element 12. Base element 11 and upstanding element 12 may be formed from 16 gauge mild steel of hollow cross-section approximately one-half inch square. In the particular embodiment shown and described herein, elements 11 and 12 were cutoff at angles slightly less than 45 degrees to provide a joint which may be secured by welding and thus provide two members secured to each other at an angle generally of less than 90 degrees. An elongated slot 13 is formed in the upstanding element 12 on the side opposite base element 11. This slot may be formed by milling or may be formed by punching the slot in a die and forming the edges in reentrant fashion back towards the inside of the hollow element 12. It has been found that when base element 11 is approximately 4 inches in length and upstanding element 12 is 3 inches in length, a satisfactory step is provided. Slot 13 is approximately 2¼ inches in length and has a number 20 wood screw 14 which is approximately 2¼ inches long secured therein. A hole (not shown) is formed transversely through a shank end 15 of screw 14. That is, screw 15 has the shank end near the open end of upstanding element 12 and a hole 16 is formed through member 12 by drilling the same near the upper end thereof. A spring pin 17 is pressed into hole 16 and the hole in shank 15 of screw 14, and is secured in place by a suitable means such as spot welding 18.

Figure 4:
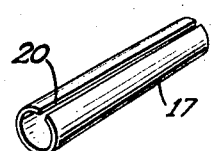
FIG. 4 is an isometric view of the spring pin used to pivotally hold the screw in place.

A more detailed view of the spring pin is shown in FIG. 4 where it will be seen that it has a slot 20 running its full length and is formed of spring steel material and is approximately ⅛ of an inch in diameter. The spring steel material must be compressed and tightly fitted through the holes of the elements just described for reasons to be explained in greater detail later.

Situated near the end of base element 11 opposite element 12, is an upward extending portion 21 which serves as a guide to prevent the climber's foot from slipping off the end of the step or base element 11.

It should also be made clear that the prior art device discussed initially herein, presents several disadvantages in the use thereof. For instance, if the screw portion is tilted slightly above the horizontal and screwed into the tree, the offset portion will never rest against the tree and all of the weight will be applied to the step portion, the result being that a tremendous amount of torque is applied and stress formed near the screw end of the step. It will also be found that if the tree is irregular along its trunk, the same condition may again exist as that just described, the result being that the step may break.

Figure 2:
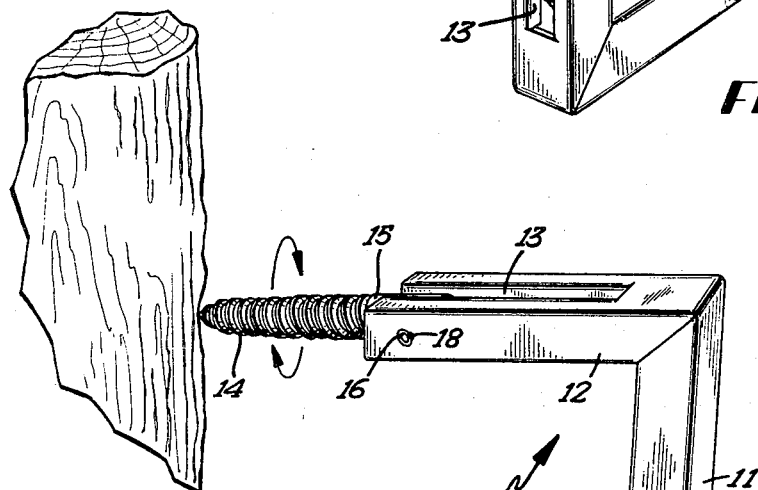
FIG. 2 is an isometric view of the support with the screw in position for driving into a tree.
Figure 3:
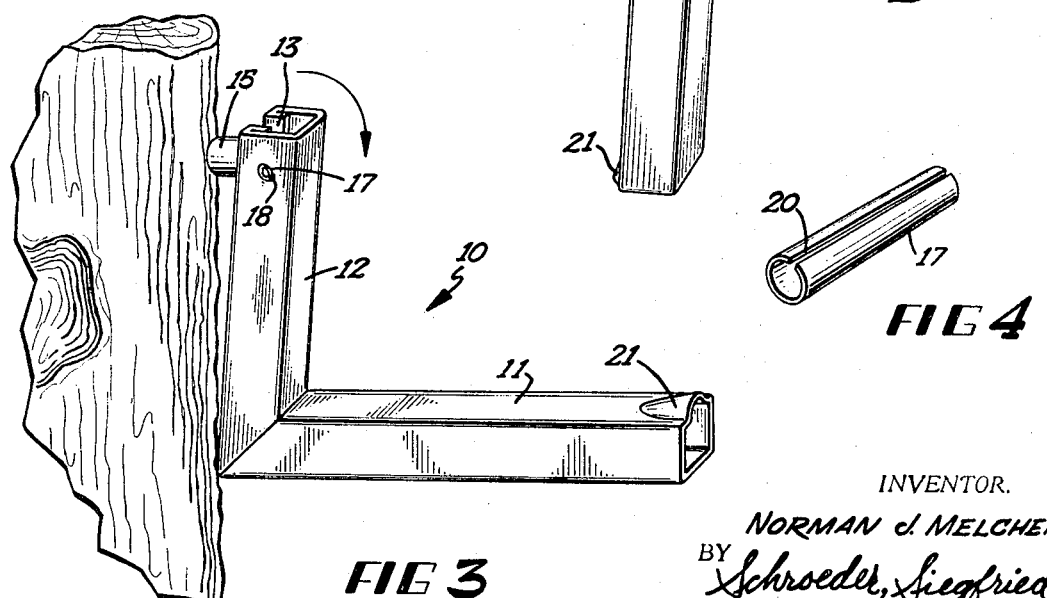
FIG. 3 is an isometric view of the support in position for use.

On the other hand, in using the present invention, screw 14 is extended to point in the direction of an extension of element 12 and through the use of elements 12 and 11, pressure may be brought to bear upon the screw and at the same time twist the screw (in the manner shown in FIG. 2 as shown by the arrow) to start the screw into the tree. In other words, the wrist action and pressure in the same manner as driving a screw into a block of wood may be used to start the screw. When the screw has been driven in sufficiently and a portion of shank 15 is left exposed, the step is then pivoted to the position shown in FIG. 3 where the joint where elements 11 and 12 come together rests against the tree. Thus it will be seen that regardless of whether the screw 14 is started at a slight angle of the trunk of the tree is irregular, the step or support member 10 may be rotated against the tree so that there is no stress or strain imparted at the joint containing pin 17. Since pin 17 is made of a spring steel, and it is compressed when initially assembled, the "handle portion" formed by elements 11 and 12 are prevented from folding back over screw 14 while the screw is being restarted into the tree.

It will also be apparent that certain modifications and variations may be made in the structure shown. For example, pin 17 may be welded to shank 15 through a hole formed therein or welded across the end of shank 15 and thus allow pin 17 to rotate in holes 16. It should also be apparent that the angle between elements 11 and 12 may be made more acute for use in hanging loads from element 11. It will also be apparent that elements 11 and 12 may be dipped in a plastic or rubber material to aid in giving a better gripping surface and prevent rattling of metal on metal if so desired.

It will, of course, be understood that various changes may be made in the form, details, arrangement and proportions of the parts without departing from the scope of my invention which consists of the matter shown and described herein and set forth in the appended claims.

What is claimed is:
1. A readily mountable and demountable load support comprising:
   (a) an L-shaped support member in which the base element has an upward extending portion at the end thereof and is longer than the upstanding element thereof;
   (b) an elongated channel formed in said upstanding element of said L-shaped member on the side opposite said base element;
   (c) an elongated screw adapted to lie in said channel having a shank element formed at the end thereof;
   (d) and a pin pivotally securing said elongated screw to said upstanding element of said support member at said shank end thereof to lie in said elongated channel in a first position and forming a further extension of said upstanding element in a second position.
2. The invention as set forth in claim 1 including:
   (e) holes formed axially and transversely to the plane of said elements in said upstanding element and transversely in said shank element of said screw, said pin passing through said holes and being secured against rotation in one of said elements and free to rotate in the other of said elements.
3. The invention as set forth in claim 2 wherein:
   (f) said pin is a spring pin weldably secured to said upstanding element and secured in the hole of said shank under circumferential spring tension to restrain said elongated screw against rotation about said pin.
4. The invention as set forth in claim 1 wherein:
   (g) said L-shaped support member is of hollow construction having a substantially square cross-section, said upstanding element having dependent reentrant members lying against the inside of said hollow member at the edges of said elongated channel.
5. The invention as set forth in claim 1 wherein:
   (h) said L-shaped support member has its elements formed at an angle no greater than 90 degrees.

References Cited
UNITED STATES PATENTS

| | | | |
|---|---|---|---|
| 704,666 | 7/1902 | Stephens | 248—216 X |
| 3,298,459 | 1/1967 | Bergsten | 182—92 |

FOREIGN PATENTS 61,217  10/1912  Switzerland.

ROY D. FRAZIER, *Primary Examiner.*

F. DOMOTOR, *Assistant Examiner.*